United States Patent [19]

Leviton

[11] Patent Number: 5,266,796
[45] Date of Patent: Nov. 30, 1993

[54] ROTARY ENCODING DEVICE USING POLYGONAL MIRROR WITH DIFFRACTION GRATINGS ON EACH FACET

[75] Inventor: Douglas B. Leviton, Dunkirk, Md.

[73] Assignee: The United States of America as represented by the Administrator of the National Aeronautics and Space Administration, Washington, D.C.

[21] Appl. No.: 971,035

[22] Filed: Nov. 3, 1992

[51] Int. Cl.$^5$ .............................................. G01D 5/34
[52] U.S. Cl. ............................ 250/231.18; 250/237 G
[58] Field of Search ...................... 250/231.17, 231.18, 250/231.19, 231.13, 231.14, 231.15, 231.16, 237 G; 359/876, 877, 216, 217, 218, 219, 221

[56] References Cited

U.S. PATENT DOCUMENTS

3,833,808  9/1974  Armand ......................... 250/231.19
4,064,435  12/1977  Stebbins ........................ 250/231.16

*Primary Examiner*—David C. Nelms
*Assistant Examiner*—K. Shami
*Attorney, Agent, or Firm*—Paul S. Clohan, Jr.; R. Dennis Marchant; Guy M. Miller

[57] ABSTRACT

A device for position encoding of a rotating shaft in which a polygonal mirror having a number of facets is mounted to the shaft and a monochromatic light beam is directed towards the facets. The facets of the polygonal mirror each have a low line density diffraction grating to diffract the monochromatic light beam into a number of diffracted light beams such that a number of light spots are created on a linear array detector. An analog-to-digital converter is connected to the linear array detector for reading the position of the spots on the linear array detector means. A microprocessor with memory is connected to the analog-to-digital converter to hold and manipulate the data provided by the analog-to-digital converter on the position of the spots and to compute the position of the shaft based upon the data from the analog-to-digital converter.

16 Claims, 6 Drawing Sheets

ROTARY ENCODING DEVICE USING POLYGONAL MIRROR WITH DIFFRACTION GRATINGS ON EACH FACET

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates generally to rotary encoding devices and more particularly to an absolute rotary encoding device with high angular sensitivity utilizing a polygonal diffraction grating.

Background Art

Many scientific, industrial, military weapons systems, and aerospace applications require precise and accurate knowledge of the angular orientation of a shaft or other rotating object. Typically, this knowledge is provided by a rotary shaft angle encoder. Encoders of the highest practical precision are relative or incremental in nature, i.e. they resolve very small angular changes and can keep track of accumulated change relative to some reference angle. In these encoders the angular information generally is lost if this reference angle becomes corrupted, e.g., through power interruption or upset by electromagnetic interference. There are also absolute encoders which provide angle information which is independent of any reference angle (except of course its own calibration, traceable to some standards maintenance organization such as NIST—formerly NBS). The absolute nature of these encoders is generally accompanied by only low to moderate angular sensitivity. Those which have the highest sensitivity are exorbitantly expensive ($30,000 to $100,000). Further, some of these encoders often achieve additional sensitivity by means of gear trains which are subject to hysteresis which limit accuracy and make the angular determination indirect.

STATEMENT OF THE INVENTION

It is therefore an object of the present invention to provide an encoding device having high absolute accuracy and angular sensitivity.

Another object of the present is to provide an encoding device that is compact and reliable.

A further object of the present invention is to provide an encoding device with continuous angular coverage for an unlimited number of turns and which can also keep track of the total angular displacement when there have been numerous turns (assuming no power interruption).

A still further object of the present invention is to provide an encoding device useable at moderately high speed (high conversion bandwidth) and which lends itself to tachometric applications.

Another object of the present invention is to provide an encoding device with redundancy attainable through additional read channels.

A further object of the present invention is to provide an encoding device that is comparatively affordable to manufacture.

A still further object of the present invention is to provide an encoding device with possible use as a secondary angular calibration standard.

Another object of the present invention is to provide an encoding device that will provide vibration/jitter information available from computation of perturbed spot shapes.

These and other objects are achieved by providing an encoding device whose operation is based on high order diffraction of light beams, which is not only absolute and direct but will provide angular sensitivity which surpasses the sensitivity of state-of-the-art incremental encoders.

DETAILED DESCRIPTION OF THE INVENTION

My inventive encoding device is a combination of several recent innovations in optical and electro-optic technologies. These components and their important characteristics are listed below. To see how the components are implemented in the device, refer to the functional block diagram (FIG. 1) and the discussion that follows under Principles of Operation for the Encoding Device.

Figure 1:
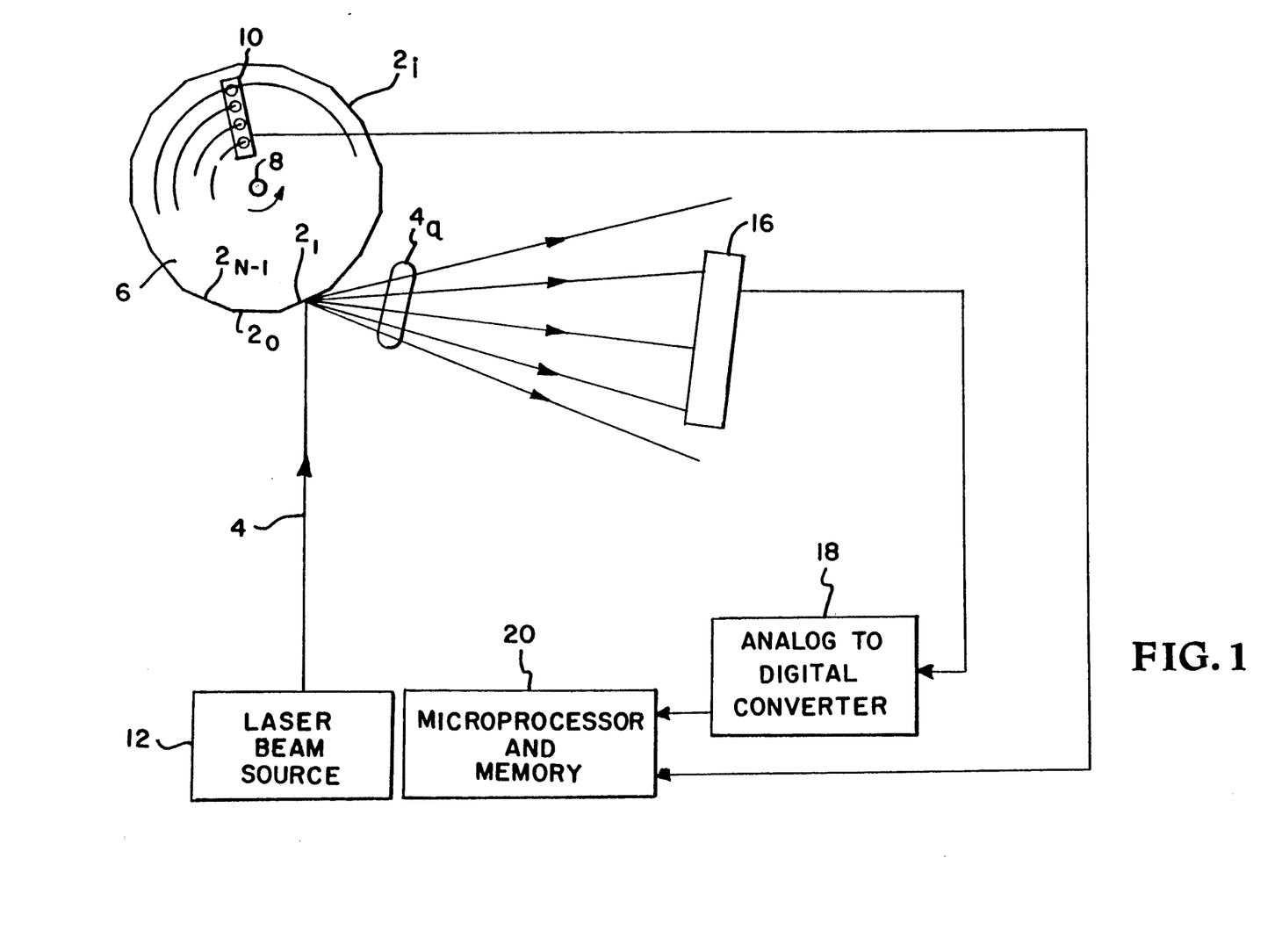
FIG. 1 is a schematic block diagram of an encoding device according to the present inventive concepts.

Monochromatic light source 12 is a compact HeNe gas laser or solid state laser (e.g., laser diode-pumped, frequency-doubled Nd:YAG or Nd:YLF) which emits beam 4 can be delivered by a small diameter fiber optic cable. Light source 12 is thus monochromatic, compact, reliable, and affordable and is directed in the form of a small diameter beam 4 with low divergence at polygonal mirror 6 which acts as an optical substrate for a multi-faceted diffraction grating, available with very small facet angle errors (subarcsecond) and excellent optical flatness on facets $2_1$-$2_N$. Attached to polygonal mirror 6 is a 4 bit binary or Gray code encoder 10 (for facet $2_i$ identification) which is simple, reliable, established and well-understood technology.

A low line density diffraction grating is on each facet $2_i$ of polygonal mirror 6. The diffraction grating is identical on every facet $2_i$, can be patterned holographically for perfect groove periodicity, patterned by photolithography through a mask, or replicated from a blazed mechanically ruled master if higher diffracted efficiency in desired orders is required.

Position sensitive detector 16 can be a CCD array detector having a linear array of a large number of diodes (200–8000) with very small pixels (7–15 µm) providing high speed/photometrically linear and uniform response to monochromatic light beam 4 provided by laser 12, and has high electronic throughput and is reliable. Detector 16 could also be an area array detector. Connected to detector 16 is 12+ bit analog-to-digital converter 18 to read out the linear array of diodes in detector 16. A floating point microprocessor 20 with double precision math processing capability and memory to hold and manipulate array detector 16 data is used and will compute shaft 8 angle absolutely based on information from facet identifying encoder 10, and positions of diffracted light spots on linear array detector 16. Microprocessor 20 is currently available in many forms with high speed and reliability and more than adequate computing capacity.

Although the encoding device employs several sophisticated components, the operation of the device will actually be rather simple and reliable as discussed below.

PRINCIPLES OF OPERATION OF ENCODING DEVICE

Figure 3:
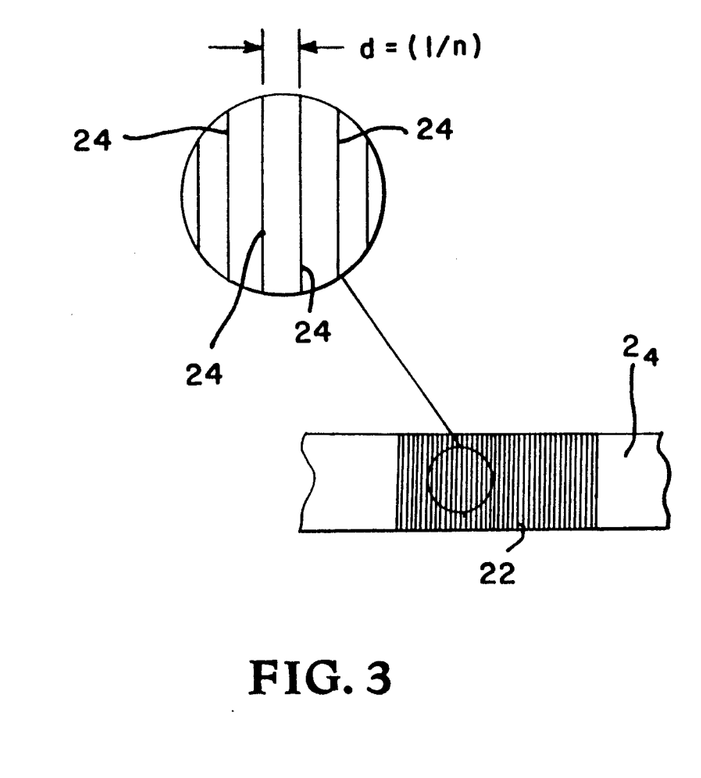
FIG. 3 is a detail view along lines 3—3 of FIG. 2.

The operation of the encoder relies on the analytically established, non-linear behavior of the angles of diffracted light beams $4_a$ (orders) from a diffraction grating 22 (FIG. 3) as the angle of incidence of light beam 4 on grating 22 is varied. The classical equation governing this behavior is the famous "grating equation" and is expressed as follows (Eq.1):

$$m\lambda/d = \sin\alpha + \sin\beta$$

where m is an integer (order number), $\lambda$ is the wavelength of light, d is the distance between adjacent grooves 24 of grating 22 (here I are assuming that all grooves 24 are straight, parallel, and equally spaced), $\alpha$ is the angle of incidence of light beam 4 with respect to the normal to grating 22 surface, and $\beta$ is the angle from that normal into which light beam 4 diffracts for the given order m.

To begin the description of the encoder's operation, for conceptual reasons only, I assume two simple things: first, that light beams can be thought of as geometric rays; and second, that the first time we see the situation in FIG. 1, shaft 8 angle $\Theta$ is such that incident light beam 4 is just intersecting the upper right end of facet $2_1$. I will begin by considering counterclockwise shaft 8 motion (positive sense for $\Theta$). Thus, incident beam 4 from light source 12 in FIG. 1 will seem to creep down facet $2_1$, changing its angle of incidence on facet $2_1$, as shaft 8 rotates.

The basic, observable phenomenon in this system will be spots of light on linear array detector 16 where diffracted beams $4_a$ (orders) intersect the line segment in space which is the linear array. At any instant in time, shaft 8 angle information is in fact determinable by the exact locations of these spots on the linear array, i.e. the intersections of rays $4_a$ with the line segment.

To see why this is so, consider the following: as shaft 8 (and polygonal mirror 6) rotates through an angle $\Delta\Theta$, the angle of incidence $\alpha$ of monochromatic source 12 light beam 4 with respect to facet $2_1$ normal changes by $\Delta\alpha$, which is exactly $=\Delta\Theta$, which causes the angular distribution of the diffracted light beams $4_a$ to change. Two crucial things happen to the light spots on the linear array detector 16. First, they move. They do so in such a way as to continue to satisfy the grating equation which is related to the second thing. Due to the non-linear nature of the grating equation, the distance between the spots changes. It is this aspect of the encoder's behavior which distinguishes it from incremental encoders and allows it to uniquely identify a shaft 8 angle within the angular range defined by the intersection of the incident source beam 4 and any identical facet $2_i$.

The behavior just described continues until the next facet $2_0$ comes around, at which point the behavior repeats itself. The desired behavior is called "modulo $2\pi/N$," where N is the number of facets $2_i$ on polygonal mirror 6 and $2\pi/N$ is called the "sector angle" in radians. The absolute shaft 8 angle is obtained by knowing the angular offset for the illuminated facet 2 and adding the uniquely defined angular component governed by the grating equation and manifested in the locations of light spots on the linear array detector 16. The angular offset is simply the facet $2_i$ number times the sector angle, where facets $2_i$ are numbered 0 through $N-1$. The angular component depending on the grating equation is computed from knowledge of the gratings' line density (inverse groove 24 spacing d), source 12 wavelength $\lambda$, and geometric concerns which are assumed to be invariant. These geometric aspects are polygonal mirror 6 dimensions, linear array 16 placement, and offset distance from shaft 8 center where incident beam 4 strikes polygonal mirror 6, defined as $x_{off}$.

To complete the description of the overall system, the location information of the light spots on array detector 16 is read from array 16 by conventional means through analog-to-digital converter 18 under the control of microprocessor 20 into microprocessor 20 memory. Once the information is in memory, it is processed or otherwise manipulated to determine shaft 8 angle through the implementation of appropriate algorithms and stored calibration data. This process can be carried out continuously many, many times per second.

CONSIDERATIONS FOR DEVICE ACCURACY, RESOLUTION, AND SENSITIVITY

Accuracy, resolution, and sensitivity are important aspects of the encoder. These aspects are influenced by a number of things (though not necessarily the same things). Resolution and sensitivity, which will be used somewhat interchangeably, are related terms in this context but with a subtle distinction. Encoder sensitivity is the degree to which a change in shaft 8 angle $\Delta\Theta$ can be sensed. For this encoder, sensitivity is a function of shaft 8 angle. The term resolution will be used when speaking of the geometric properties of the encoder which in part determine sensitivity but are independent of shaft 8 angle.

Figure 2:
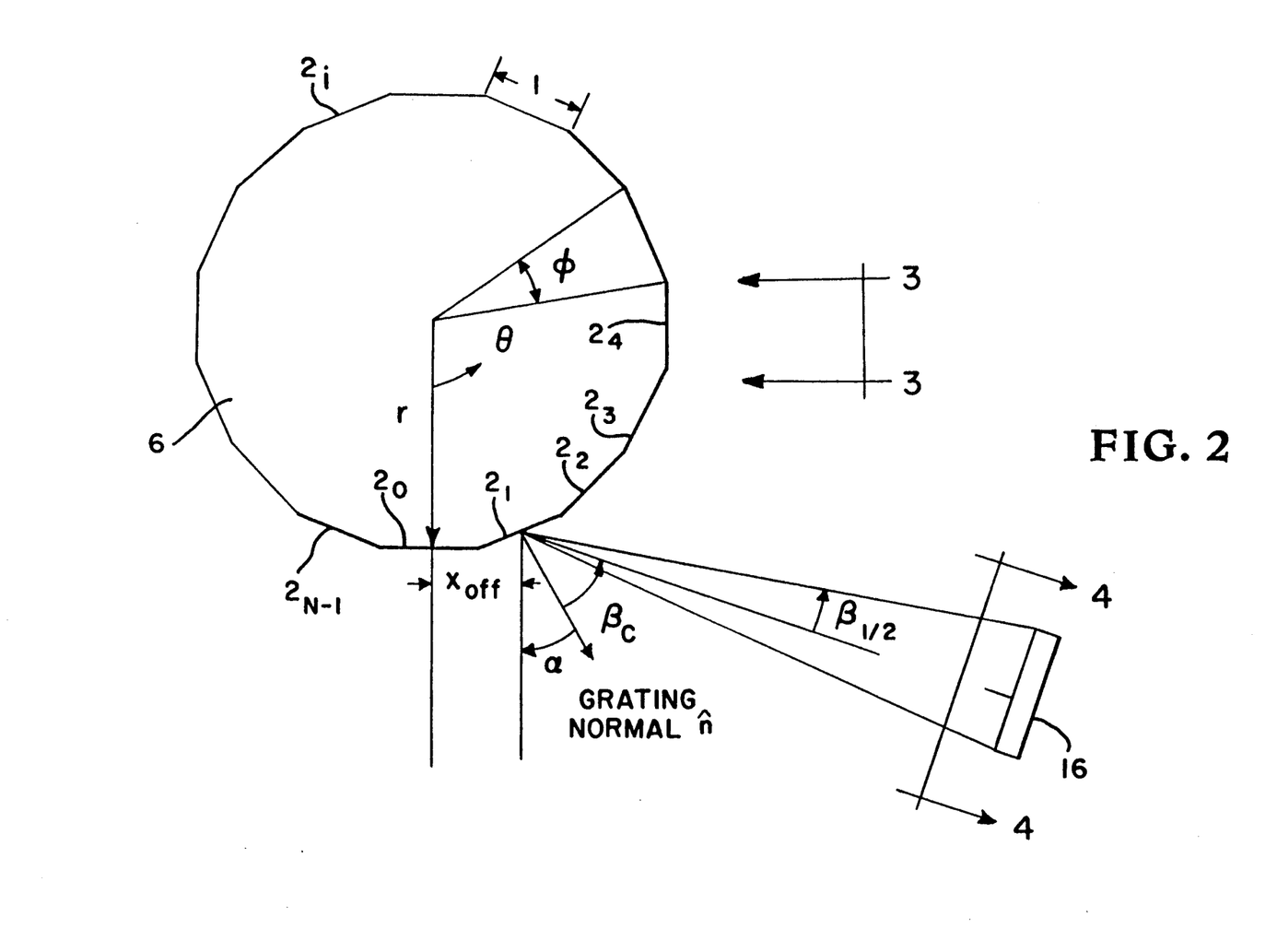
FIG. 2 is a detail view of the geometry involved in the encoding device shown in FIG. 1.

FIG. 2 is a detail view of the geometry involved in the encoding device shown in FIG. 1. First, I will describe polygonal mirror 6. Its two chief attributes are the number of facets $2_i$, N, previously described, and what I will call facet $2_i$ radius, r, which is the perpendicular distance from the center of polygonal mirror 6 (and shaft 8) to the center of any facet $2_i$. The previously described sector angle will be called $\phi$. Facet $2_i$ length will be called "l" and is computed as (Eq. 2):

$$l = \frac{r}{2\tan(\phi/2)}$$

Figure 4:
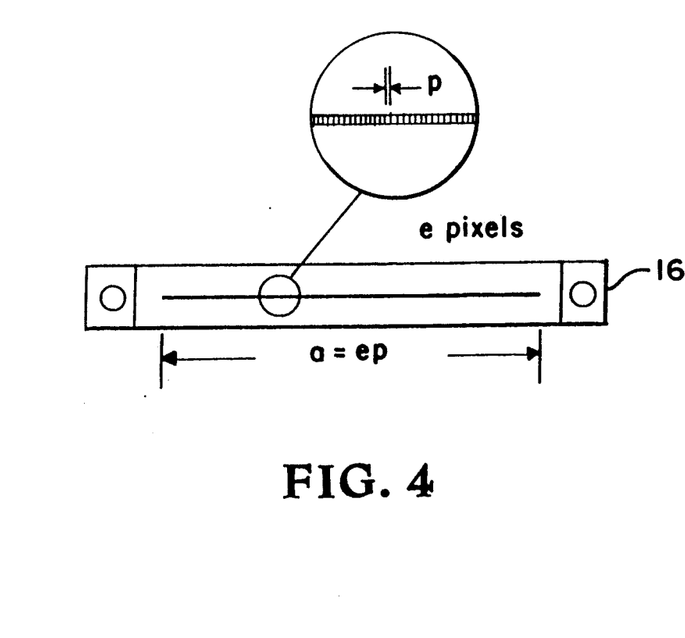
FIG. 4 is a detail view along lines 4—4 of FIG. 2.

Next, I will describe the line density of grating 22 as n, in lines per mm. n is the reciprocal of d, the line spacing, described earlier. When n is used in a computation with the wavelength $\lambda$ expressed in $\mu$m, it is inverted and multiplied by 1000 so that the resulting number will also be in $\mu$m. I turn next to detector array 16 (see FIG. 4) whose pixel dimension p along the array is typically in the range from 7 to 20 $\mu$m. The array length a is then simply the number of elements e times p. This is most conveniently expressed in mm. Laser beam 4 diameter b will also be described in mm. The beams will either be Gaussian in profile as from a laser or formed from a spatial filter/collimator arrangement and will likely be diffraction limited. In either case, I will assume that beam 4 will be of Gaussian type, where b will refer to the diameter of beam 4 at its 1/e power points. The details of the spatial distribution of beam 4 irradiance are not important as long as the distribution is invariant for each order $4_a$ as it traverses array detector 16.

Finally, I turn to the angular relationships of the encoder geometry. I begin by considering shaft 8 angle $\Theta$ to be zero when facet number $2_0$ is horizontal and facing the bottom as shown in FIG. 2. Again, the angle of incidence $\alpha$ of laser beam 4 on a facet $2_i$ is relative to that facet's surface normal and depends on two things: one, the quantity I referred to earlier as $x_{off}$ which is a fractional quantity normalized to facet $2_i$ radius describing the offset distance from shaft 8 center where beam 4 strikes polygonal mirror 6; and two, $\Theta$ itself. The two other angles in this geometry, along with $x_{off}$, uniquely describe the placement of linear photodiode array 16 with respect to polygonal mirror 6. One angle is called the "center $\beta$," $\beta_c$, defined as the angle between facet $2_i$ normal and the perpendicular bisector of array 16 when incident beam 4 strikes the center of any facet $2_i$. This defines a direction along which array 16 can be adjusted closer to or farther from polygonal mirror 6. The other angle is called the "beta halfrange," $\beta_{\frac{1}{2}}$, which describes the angle subtended by one-half of array 16 length as seen from the center of facet $2_i$ when incident beam 4 strikes the center of facet $2_i$. This angular subtense places array 16 at a unique position on the line described by $\beta_c$.

RESOLUTION AND SENSITIVITY

From FIG. 2, it is reasonably clear that the following things will place an upper bound on the angular resolution of the encoding device. These are: the beta halfrange $\beta_{\frac{1}{2}}$, the number of array 16 elements e, the pixel size p, and, to a less obvious degree, beam 4 diameter b. Other things which will affect the sensitivity of the encoder in such a way as to enhance it but which are not evident from FIG. 2 are: the ability to accurately compute the centroid locations of individual spots from digitally converted array 16 data, the ability to compute the difference in centroid locations for all pairs of spots simultaneously on array 16, multiple sampling (averaging) of light spot location data, and processing for redundant/additional channels with added computational constraints.

The least obvious but perhaps most important factor is the photometric accuracy with which light spots can be digitally converted by the system. The photometric accuracy can be increased (but not without limit) by multiple sampling but at the expense of system bandwidth. This will be addressed later under analysis of performance.

One other subtle thing is not obvious from FIG. 2. In order to compute the difference in location for orders $4_a$ on array 16, there must be at least two orders $4_a$ on array 16 at all times. This drives the choice of line density n which is coupled to the other parameters, $\beta_c$ and $\beta_{\frac{1}{2}}$. The latter three parameters are most easily selected using a specialized computer program. Also, due to the non-linear behavior of the grating equation, sensitivity is not constant over any angular range but has a lower bound for some point in the range of angles of incidence encountered for each facet $2_i$.

Vibration will affect instantaneous resolution, but in a way which, is common to all sensitive encoding devices. As such, vibration is outside of the scope of this disclosure.

ACCURACY

As with any device, there are a characteristic set of things which will affect the encoder system accuracy. However most of these can be taken care of in a calibration program. The other light in which to view the question of accuracy is "what might happen to change the calibration?"

The things that affect accuracy which can be calibrated out at the system level are: thermal/mechanical changes, distortions due to assembly, facet $2_i$ flatness, phase accuracy of grating 22 lines across each facet $2_i$, knowledge of dimensions, knowledge of facet $2_i$ angle errors, variations in the array photoresponse, and electronic conversion of light information.

An ordinary spectral line emission lamp 12 such as a low pressure Hg lamp used with a narrow-bandpass filter (or some other of wavelength selector such as a prism or grating) or gas laser such as the common HeNe laser, is the preferred type of light source 12. In principle, emission wavelengths from these will be constant to a very high degree. While laser 12 source can have very narrow emission linewidths, a lamp's spectral linewidths will also be adequately narrow for the encoder to function properly.

If light source 12 is a solid state laser, system accuracy will be most significantly affected by thermal dependence of light source 12 spectral emission, i.e. $d\lambda/dT$. Thermal dependence of spectral emission for a solid state laser 12 might be essentially eliminated with adequate temperature control of laser 12 and/or compensated for by the added system complexity of temperature sensing and computational compensation. Thermal dependence of light source 12 spectral emission will be discussed in more detail later.

Most, if not all, of the previously mentioned aspects can be minimized by appropriate component specifications to a degree which might obviate calibration altogether. Such specifications might include: suitable optical flatness on polygonal mirror 6 facets $2_i$, materials with suitable stiffness and low coefficient of thermal expansion, incorporation of a temperature sensor allowing thermal compensation to be implemented, etc. Mounting distortion can not be calibrated out unless calibration is performed after mounting which may not always be feasible. According to experts in the rotational encoder industry, the ultimate limitation of an encoder is its bearings and shaft 8 coupling. Again, these mechanical aspects of encoder design are not within the scope of this disclosure. Here, I am concerned only with the aspects of encoders from which angular information is derived. It is, however, interesting to note that the operating principles of this device may make it intrinsically relatively immune to the type of mechanical misalignments which plague conventional rotary encoders, e.g., non-concentricity or tilt of shaft 8 and encoder and shaft 8 wobble.

These are a few things which can affect the size of the diffracted spots on array 16 which in turn can be calibrated out. These are the raw beam 4 size from light source 12, the number of illuminated grooves 24 on gratings 22 coupled with the line density of gratings 22, facet $2_i$ flatness, light source 12 emission linewidth (discussed later) and the other optical properties of an ancillary beam shaping optics which might be employed.

ANALYSIS OF PERFORMANCE

Because light source 12 and detector array 16 are fixed with respect to each other, and polygonal mirror 6 rotates with respect to these, the positions of the diffracted orders $4_a$ on array 16 are related to the difference between the incident and diffracted angles, i.e. to $\beta - \alpha$. The geometric angular sensitivity of the situation is directly related to the rate of change of this difference for a given order m with respect to incident angle $\alpha$, specifically to the derivative $d(\beta-\alpha)/d\alpha$. Eq. 1 rearranged and solved for $\beta$ gives (Eq. 3):

$$\beta = \arcsin(m\lambda/d - \sin\alpha)$$

Then, $d(\beta-\alpha)/d\alpha$ is given by (Eq. 4):

$$\frac{d(\beta - \alpha)}{d\alpha} = -\cos\alpha [1 - (m\lambda/d - \sin\alpha)^2]^{-\frac{1}{2}} - 1$$

From this equation, I can make a few observations about which source 12/polygonal mirror 6/array 16 placements will be advantageous. For the zero order diffracted beam $4_a$ (the order which behaves as the ordinary, mirror-like or specular reflection), eq. 4 evaluates to $-2$ for all $\alpha$. This is consistent with Snell's law of reflection and the familiar "2Θ deflection" law for specular reflections. The minus sign is consistent with the standard sign conventions for $\alpha$ and $\beta$ in the grating equation. For orders near zero order, this "sensitivity" remains near $-2$. What does it take for Eq. 4 to tend to a maximum? The cos $\alpha$ term is largest when $\alpha$ is around 0. Eq. 4 will also tend to be maximized when the radical, being in the denominator, becomes small. This occurs when the term $m\lambda/d - \sin\alpha$ approaches unity. But this latter term is exactly sin $\beta$ from Eq. 1. Sin $\beta$ approaching unity means that the diffracted light $4_a$ comes off grating 22 nearly tangent to the surface or at "grazing" angles. For $\alpha = 0$, this occurs for increasing order numbers. The nonlinearity of Eq. 4 increases dramatically for larger orders and for near-zero $\alpha$'s. The choice of incident angle is rather a choice of a range of incident angles which gives good angular sensitiity over the entire angular range defined by a facet $2_i$.

What I currently believe to be a good set of baseline encoder parameters is: 00% radial offset ($x_{off}=0$) of the incident beam from polygonal mirror 6 axis, 20 lines/mm gratings 22, 16 facets $2_i$, $\beta_{\frac{1}{2}}=5.0°$ and $\lambda = 0.532$ μm. These parameters are not optimal choices but are suitable for illustrating these claims. This design was used in a study of system angular sensitivity and the effect of source 12 spectral emission variations. The linear array 16 in this design in an Eastman Kodak device with 8000 pixels which are 9 μm×9 μm in size. The geometric angular plate scale on array 16 is 4.5 "arc/pixel.

Figure 5:
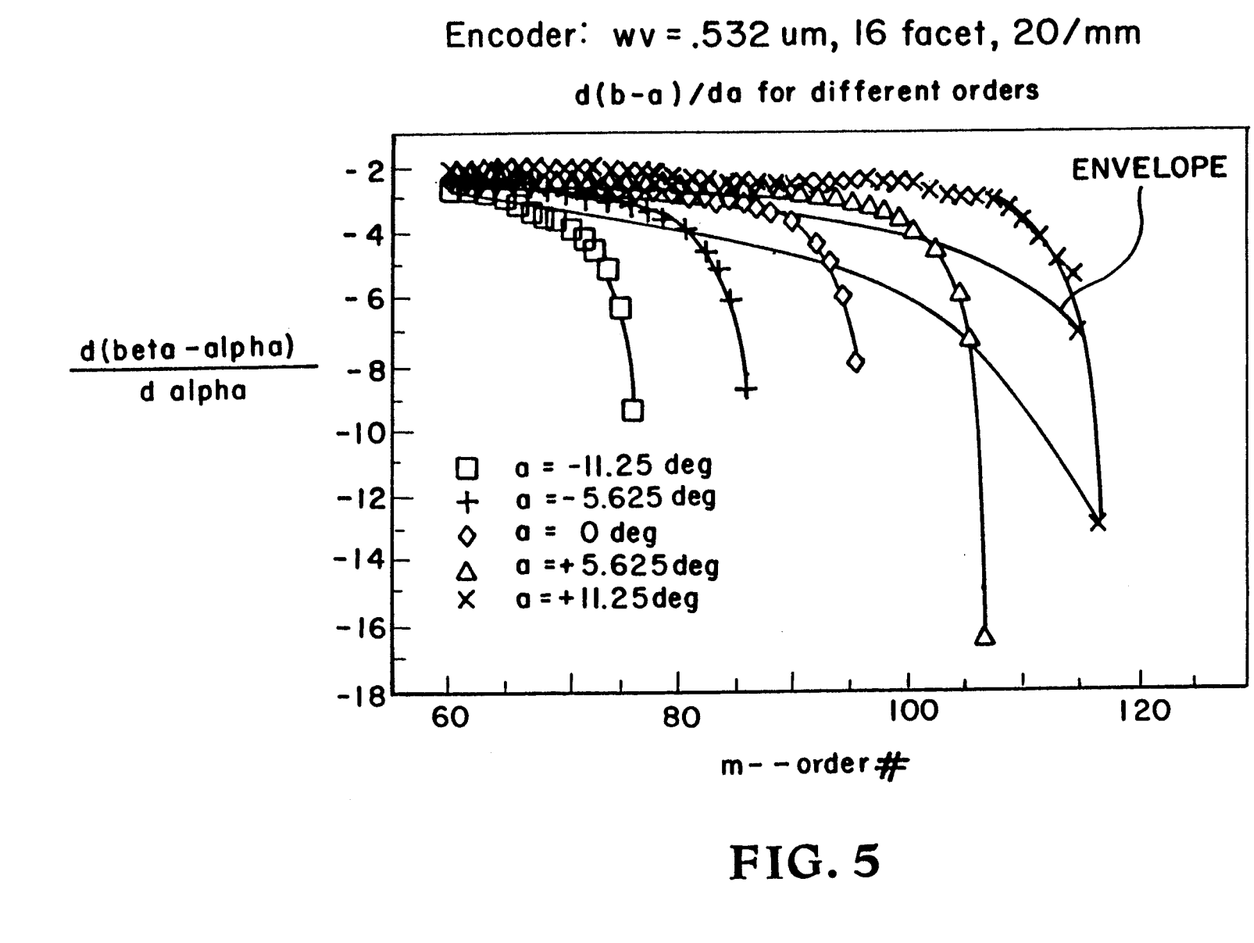
FIG. 5 is a graph of the geometric sensitivity envelope for a representative encoder design.

Equation 4 has been used to compute a "geometric sensitivity envelope" for this baseline design. Remember that $d(\beta-\alpha)/d\alpha$, or equivalently $d(\beta-\alpha)/d\Theta$, is a dimensionless number which describes an angular amplification of deflection of diffracted beams $4_a$ relative to the incident beam 4. This computed envelope is shown in FIG. 5. For this design $\alpha$ ranges from $-11.25°$ to $+11.25°$. For $\alpha$'s between $-11.25°$ and $0°$, the geometric sensitivity or amplification is between about 3 and 5. For $\alpha$'s at the upper end of the range, the amplification takes on values in excess of 7 and sometimes as high as 14 to 20!

Resolution is defined as the geometric, angular increment corresponding to the minimum resolvable displacement of a light spot on linear pixel array detector 16. It turns out that its upper limit is established by the angular subtense of a pixel as seen by the point on a polygonal mirror 6 facet $2_i$ where source 12 beam 4 is incident, i.e. by $2\beta_{\frac{1}{2}}/e$. Obviously, resolution is enhanced by having as many pixels of the least size possible in linear array 16. It is also enhanced by having as small a beta halfrange $\beta_{\frac{1}{2}}$ as possible. These two things means longer baselines for diffracted beams $4_a$. Longer baselines can be accomplished simply by folding beams $4_a$ around within the package with flat mirrors to maintain a rigid, compact device. These geometric concerns affect array 16 placement. Also, remember that ultimately, array 16 placement depends on the constraint that there must always be at least two orders $4_a$ on array 16 at any instant in time.

Due to the ability to compute the centroid of the light distribution of a spot on the pixels of array detector 16, resolution can be extended well below the single pixel level. A simulation was performed to study CCD array 16 subsystem's capabilities in this regard. The simulation accounted for the following effects: beam 4 shape and size and irregularities therein, pixel-to-pixel photoresponse variation, system conversion noise, and repetitious sampling. In the simulation, a photoresponse for each array 16 pixel was chosen randomly within selectable prescribed limits. A target location for a perfect Gaussian profile was randomly chosen to fall somewhere on array 16. Then a Gaussian, whose half-width is selectable but whose pixel value at each pixel is randomly perturbed by some noise factor within selected limits, was computed along with its effective centroid location and error relative to the foreknown target Gaussian center. If multiple samples have been specified, the average of that number of samples is considered to be the result. This was repeated one hundred times for each set of prescribed limits. Mean error, variance, and standard deviation were then computed for the one hundred samples.

The simulation was parameterized as follows. Three different Gaussian spot sizes (diameters) were tried: 0.40 mm, 0.80 mm, and 1.6 mm diameters. Four different combinations of system noise and pixel-to-pixel variations were tried for each spot size. With one exception, two different numbers of samples—1 and 3—were tried for each combination of system noise and pixel-to-pixel variation. The parameterization is tabulated in Table I.

TABLE I

| System Noise (%) | Pixel-to-pixel Variation | Samples |
|---|---|---|
| 3 | 2 | 1 |
| 3 | 2 | 4 |
| 2 | 1 | 1 |
| 2 | 1 | 3 |
| 1 | 1 | 1 |
| 1 | 1 | 3 |
| 0.5 | 0.5 | 1 |
| 0.5 | 0.5 | 3 |

Figure 6:
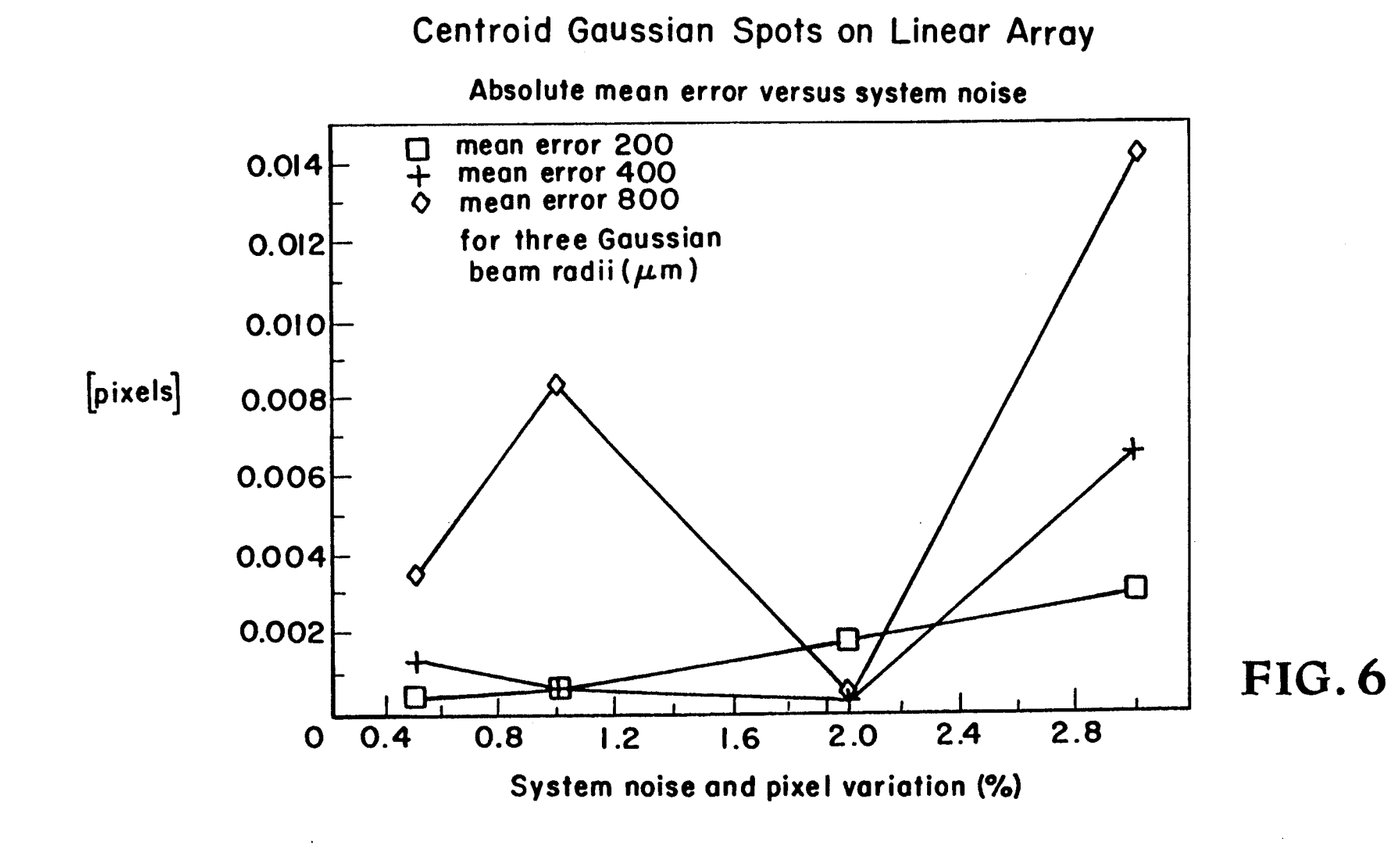
FIG. 6 is a graph of the mean error in determining spot locations.
Figure 7:
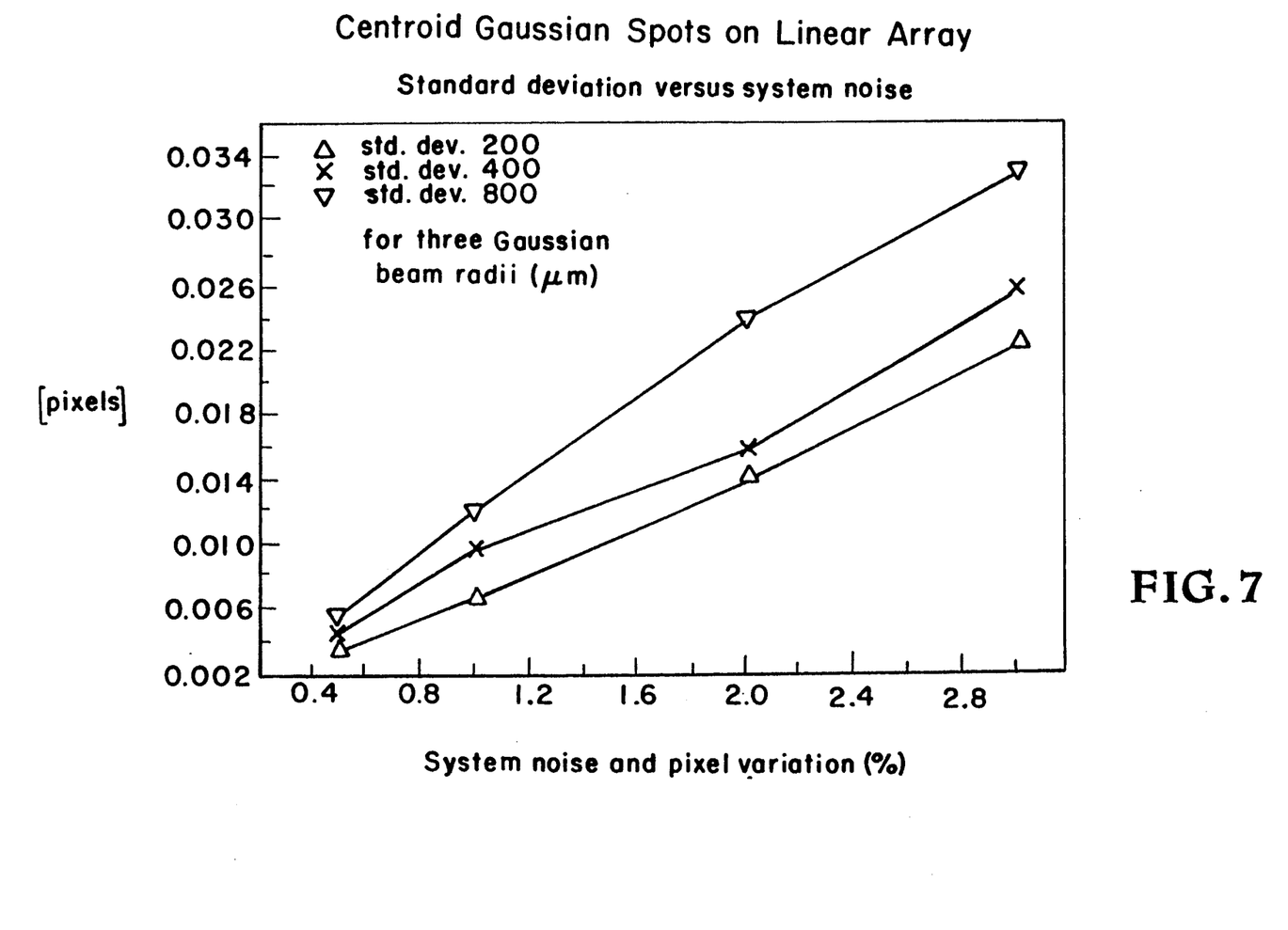
FIG. 7 is a graph of the standard deviation in determining spot locations.

The results for means error and standard deviation in pixels for single sample simulations are shown in FIGS. 6 and 7 respectively. The results indicate the two obvious things one would expect: that performance improves for 1) lower system noise and lower pixel-to-pixel variation and 2) smaller spot sizes. CCD experts believe that in practice, pixel-to-pixel variations and system noise can be systematically reduced to less than 0.5% each. This immediately focusses attention to the left-hand part of the figures. Even for the largest spot size studied, 1.6 mm Gaussian diameter, the mean error and standard deviation are only several millipixels. To be conservative, I believe 0.005 pixels is an achievable number for centroided pixel resolution. This assumes one can get a spot size under 1.6 mm diameter. Note that this value is not inconsistent with routine centroiding capabilities for area CCD arrays with light spots only several pixels wide (which makes centroiding considerably less certain) where 0.01–0.02 pixel certainties in centroid are achieved.

I will now discuss what spot size to expect. Assumed is the use of a compact HeNe laser 12 with an exit spot diameter of 0.7 mm and a beam 4 divergence of 1 mrad. This design has a total path length roughly 0.4 m. This distance combines with beam 4 divergence to increase the spot size from 0.7 mm to $0.7+400\times0.001=1.1$ mm which is well less than 1.6 mm. The other thing which can increase the spot size is the diffracted angular range associated with source 12 linewidth and particularly the way that range changes with increasing order number.

With appropriate intracavity optics, a gas laser 12 can have an emission linewidth far narrower than its Doppler broadened gain curve, characteristic of the warmed, excited gas in the plasma tube. So, to consider the worst case, I shall compute the line width and corresponding spot size for Doppler broadened emission from, say, neon gas. The linewidth in frequency space for a gas species whose atomic mass is M [amu] and temperature T [K] is:

$$\Delta v = 2v\sqrt{\frac{kT}{Mc^2}}$$

where $v$ is the oscillation frequency [1/s], c is the speed of light ($3\times10^8$ m/s), and k is Boltzmann's constant. For neon gas (M=20) at 400° K. (100° C.), the linewidth is about $1.3\times10^9$ Hz. Frequency linewidth and wavelength linewidth are related by the expression:

$$\Delta\lambda = -\lambda^2\cdot\Delta v/c$$

Here, the corresponding wavelength spread turns out to be about 0.02 Å. How wide then would a source 12 linewidth have to be to see an increase in spot size of 0.5 mm diameter in the design? If we calculate $\beta-\alpha$ for the highest order at the edge of array 16 for this wavelength, then dither the wavelength slightly, we get a slightly different $\beta-\alpha$ which means a slightly different spot location on array 16. It takes a wavelength spread of about 1.3 Å (or over 60 times the Doppler broadened linewidth) to cause the diffracted spot to grow by 0.5 mm to 1.6 mm diameter. This means that emission 4 linewidth for even an ordinary gas line source 12 is not an issue to system performance.

I will now discuss the encoding device's angular sensitivity. A rough method for computing encoder sensitivity is by equating sensitivity to the centroided pixel resolution times the geometric angular plate scale divided by the geometric sensitivity developed above. Substituting the worst case numbers gives:

0.005[pixels]×4.5["arc/pixel]/3=0.0075["arc].

(at some angles, the sensitivity would be as small as about 0.002 "arc)

A more rigorous method invokes the use of a specialized computer program and a simple study of how many pixels are traversed as shaft 8 rotates through one unit of angle. For example, a value for order number 112 of 6 pixels per 1 "arc change in shaft 8 angle was derived. The actual value of shaft 8 angle is held in this instance in the differences in pixel locations for the pairs of orders 110 and 111, 110 and 112, and 111 and 112. Relying only on difference information, we get a sensitivity of 4.7 pixels per 1 "arc change in shaft 8 angle. Coupled with the ability to determine spot location to the 5 millipixel level, an angular sensitivity of 0.005 pixels/5 pixels per 1 "arc change in shaft 8 angle or 0.001 "arc sensitivity is available.

Compare these values with the state-of-the-art, conventional optical encoder which is 26 bit resolution or 0.02 "arc. According to NIST's Angular Measurements Laboratory the NIST angle calibration machine is not currently but will ultimately be good to 0.003 "arc. The encoding device disclosed here can thus yield a 10–20 fold increase in angular sensitivity or resolution.

OTHER CONSIDERATIONS

The situation previously described where the next facet $2_i$ presents itself to the incident source 12 beam 4 was intentionally oversimplified. In reality, there will be a small range of angles where two facets $2_i$ will be illuminated and there will be two sets of spots on array 16 simultaneously. While it seems as if this might be an uncomfortable situation, this behavior will be not only trivial for microprocessor 20 to hand.e, but will in fact be advantageous in a calibration sense when the boundary conditions of equality of rate of change of shaft 8 angle with computed incident angle ($d\Theta/d\alpha$) is enforced for both sets of spots. Alternatively, with the addition of a second source 12/linear array 16/A-to-D converter 18 channel, the simultaneous facet $2_i$ situation can be averted with the added advantages of redundancy in the case of a failure in one channel and additional accuracy with the imposition of further boundary conditions associated with the existence of that second channel.

While the lower limit on the number "N" of facets $2_N$ is three, there is no intrinsic upper limit for N. However, there are some practical concerns which lead to an optimum choice for N. The fewer facets $2_i$ there are, the fewer facet-to-facet angle errors must be kept track of. This must be balanced against the desire to assign as little angular range to a given facet $2_i$ as possible (minimize the sector angle $\phi$) so that the number of orders on array 16 does not vary wildly as the incident beam 4 traverses the entire facet $2_i$. Finally, it is convenient to have a number of facets $2_i$ which is a power of 2 so that facet $2_i$ identification can be done with a simple, piggybacked, binary encoder. Based on studies, it turns out that 8, 12, and 16 are good choices for number "N" of facets $2_i$ with 16 being an optimum.

Adding additional source 12/detector 16 channels can provide several advantages. Multiple independent samples offer improved certainty of angular, determination, possible self-calibration, redundancy in the event of a failure of one channel, and some degree of immunity to defects in one or more facets $2_i$ or in one particular linear array 16. The disadvantages of multiple channels are slight increases in data storage requirements and computational/operational complexity, and a slight decrease in system conversion bandwidth.

With regard to vibration, it is possible that the encoding device could also be used to give information about the vibration environment in which it is used. This would be done either through time-averaged or even time-resolved computations on spot shape perturbations measured from the linear array 16.

Although it can be highly advantageous to calibrate such a device, it is interesting to note that the device itself has intrinsic features which will allow it to be used with substantial accuracy without calibration. Furthermore, it is possible that the device might find application as either a secondary or perhaps even primary angular calibration standard.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A device for encoding the angular displacement of a rotating shaft about its axis of rotation comprising:
    a polygonal mirror having a plurality of facets thereon affixed to said shaft;
    a monochromatic light beam directed towards said facets;
    said facets of said polygonal mirror each having a low line density diffraction grating patterned thereon to diffract said monochromatic light beam into a plurality of diffracted light beams such that a plurality of light spots are created on a position sensitive detector means;
    an analog-to-digital converter means connected to said detector means for reading the position of said spots on said detector means;
    processing and memory means connected to said analog-to-digital converter means to hold and manipulate data provided by said analog-to-digital converter means on the position of said spots and to compute the angular displacement of said shaft about its axis of rotation based upon the data from said analog-to-digital converter means.

2. The device of claim 1 further including a binary code encoder affixed to said polygonal mirror for identification of one of said plurality of facets.

3. The device of claim 2 wherein said monochromatic light beam is emitted by a gas laser.

4. The device of claim 2 wherein said monochromatic light beam is emitted by a solid state laser.

5. The device of claim 2 wherein said monochromatic light beam is emitted by a gas source and suitably monochromated by optical filtration or dispersion.

6. The device of claim 4 wherein said monochromatic light beam is directed towards said facets by a fiber optic cable employing beam shaping optics.

7. The device of claim 1 wherein said low line density diffraction grating is patterned holographically on said facets.

8. The device of claim 1 wherein said low line density diffraction grating is patterned by replication from a blazed mechanically ruled master on said facets.

9. The device of claim 1 wherein said low line density diffraction grating is patterned by photolithographic means involving a mask.

10. The device of claim 1 wherein said low line density diffraction grating is patterned by a molding process.

11. The device of claim 1 wherein said position sensitive detector means comprises a linear array detector means.

12. The device of claim 1 wherein said position sensitive detector means comprises an area array detector means.

13. The device of claim 11 wherein said linear array detector means contains a large plurality of diodes with very small pixel size.

14. The device of claim 13 wherein said plurality of diodes is in the range of 200 to 8000 and said pixel size is in the range of 7–15 $\mu$m.

15. The device of claim 1 wherein said polygonal mirror has a number of facets thereon which are a power of 2.

16. The device of claim 15 wherein said polygonal mirror has 16 facets thereon.

* * * * *